United States Patent [19]

Avigal et al.

[11] 4,288,502
[45] Sep. 8, 1981

[54] PHOTO-ELECTROCHEMICAL CELL BATTERY

[75] Inventors: Yitzchak Avigal, Givataim; Joost Manassen, Rehovot; Gary Hodes, Rehovot; David Cahen, Rehovot, all of Israel

[73] Assignee: Yeda Research & Development Co., Ltd., Rehovot, Israel

[21] Appl. No.: 141,795

[22] Filed: Apr. 21, 1980

[30] Foreign Application Priority Data

Apr. 22, 1979 [IL] Israel .................................... 57109

[51] Int. Cl.³ .............................................. H01M 6/36
[52] U.S. Cl. .................................... 429/111; 429/149; 429/160; 429/185
[58] Field of Search ............... 429/111, 57, 149, 156, 429/157-159, 160, 163, 176, 179, 185, 66, 153

[56] References Cited

U.S. PATENT DOCUMENTS

| | | | |
|---|---|---|---|
| 2,603,671 | 7/1952 | Burns et al. | 429/160 |
| 4,085,257 | 4/1978 | Witzke | 429/111 |
| 4,086,398 | 4/1978 | Cartmell et al. | 429/111 |
| 4,090,933 | 5/1978 | Nozik | 204/129 |

Primary Examiner—Aaron Weisstuch
Attorney, Agent, or Firm—Sandler & Greenblum

[57] ABSTRACT

A battery comprising a plurality of photoelectrochemical cells arranged in series in an envelope. Each of the cells comprises a photoelectrode, a counterelectrode, and an electrolyte. The photoelectrode and counterelectrode of each cell is attached to and forms an electrical contact with conductive means. The battery further comprises at least one separation means for separating each of the cells from one another so as to form a liquid-tight fit within the envelope whereby each of the cells is liquid tight. A method of assembling a battery comprising a plurality of photoelectrochemical cells in an envelope. The method comprises inserting a module within the envelope, filling the envelope with liquid, and inserting an additional module. The process is repeated until a battery having the desired number of cells is formed.

21 Claims, 3 Drawing Figures

PHOTO-ELECTROCHEMICAL CELL BATTERY

BACKGROUND OF THE INVENTION

1. Field of the Invention

The invention relates to a coupling system for coupling a plurality of electrochemical cells arranged in series, and more particularly to a coupling system for coupling a plurality of consecutive photoelectrochemical cells. The cells are arranged in a shell or envelope, separation means being provided between the individual cells contained in the envelope whereby a leakproof arrangement which also inhibits corrosion is provided.

2. Description of Prior Art

Photoelectrochemical cells and their arrangement are described in various patents and articles in literature. Amongst these there may be mentioned "Semiconductive Liquid Solar Cells", A. Heller ed., The Electrochemical Society, Proceedings Volume 77-3, Princeton, N.J. (1977); and MANASSEN et al, U.S. Pat. No. 4,064,326, the disclosure of which is hereby fully incorporated by reference.

Bipolar electrodes have been described by J. Manassen. G. Hodes and D. Cahen in "Electrode Materials and Processes for Energy Conversion and Storage", J. D. E. McIntyre et al ed., The Electrochemical Society, Proceedings Volume 77-6, Princeton, N.J. (1977), p. 110.

Hitherto no simple satisfactory system has been described for the arrangement in series of a plurality of photoelectrochemical cells resulting in the required elevated voltages while overcoming problems of leakage and corrosion.

SUMMARY OF THE INVENTION

The present invention relates to a system comprising a plurality of electrochemical cells arranged in series in an envelope with separation means and conductive means being provided between the individual cell compartments. The separation means prevent leakage between the individual cell compartments.

According to a preferred embodiment, the cells are photoelectrochemical cells such as those of the type disclosed in U.S. Pat. No. 4,064,326 and comprise a photoelectrode and a counterelectrode attached to the conductive means of the separation means.

The separation means are adapted so as to be able to slide in the envelope, allowing for movement of the partition means when volume changes of the electrolyte take place due to temperature changes.

According to the inventive arrangement, each individual cell preferably comprises a photoelectrode, a counterelectrode, and an electrolyte. The electrodes are attached to the two separators forming the lateral boundaries of the compartment, respectively. At the two ends of the tubular battery, separation means are provided which are rigidly attached to the walls of the envelope, with resilient conductive means being provided to allow for volume changes.

A large number of such cells can be arranged in series, and thus a desired voltage can be attained.

The separation means forming the boundaries of the individual compartments may be made of a suitable chemically resistant resilient material which forms a sliding seal with the envelope. Such partitions can be made from inert metals provided with a suitable material at its rim in contact with the envelope such as rubber and polymers such as polytetrafluoroethylene, or the like. When a metal is used, the photoelectrodes can be welded to the partition at both its lateral sides. In some cases the surface in contact with the electrolyte must be coated with a suitable inert coating. The surface of the partition on the photoelectrode side is preferably selected such that it ought not to have any catalytic properties in the electrolyte system used.

The envelope which constitutes the housing of the individual compartments defining the cells of the battery can have any suitable cross-section, e.g., circular, oval, rectangular or polygonal, or any combination thereof. The preferred material is glass or a suitable polymer which has suitable optical properties. According to one embodiment of the invention, the envelope may be constituted by a fluorescent lamp envelope of the type which are commonly available, whose surface is substantially transparent to solar radiation and which comprises end members having a single prong inserted within each end thereof. By flattening the envelope surface, the photoelectrode may be placed in close proximity to the wall of the envelope. Bent shapes make it possible to concentrate solar energy onto the photoelectrodes particularly when used in conjunction with reflector means. Such reflector means may be provided on the inside or outside of the envelope. Reflector means can form part of the envelope, be attached thereto or may be arranged at some distance apart from the envelope.

The envelope preferably comprises an arrangement, in case of photoelectrochemical cells, such that entry of solar radiation is permitted from a suitable direction. Radiation may enter directly or via reflection by any appropriate means.

Conventional photoelectrodes, counterelectrodes and electrolytes can be used for the individual photoelectrochemical cells.

BRIEF DESCRIPTION OF THE DRAWINGS

The invention is described in the description which follows with reference to the annexed schematic illustrations, which are not according to scale, and in which.

DESCRIPTION OF PREFERRED EMBODIMENTS

Figure 1:
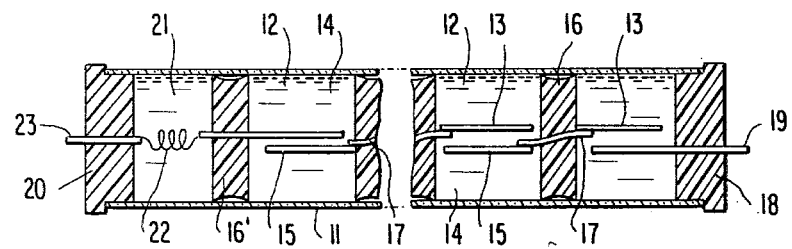
FIG. 1 is a longitudinal cross-sectional view of a tubular multi-cell arrangement of the invention.

As shown in FIG. 1, the photoelectrochemical battery comprises an envelope 11 which, in the embodiment shown, has a circular cross-section. The envelope 11 has a plurality of individual compartments 12, each of which constitutes a photoelectrochemical cell comprising a photoelectrode 13, an electrolyte 14, and a counterelectrode 15. A partition 16 is provided as the boundary of each compartment at each of its ends. Electrodes 13 and 15 are attached to corresponding conductive members 17 extending through corresponding partitions. The terminal right-hand side cell is closed by closure member 18, which is firmly attached to the envelope 11, and an electrically conductive member 19 extends through closure member 18. The left hand side of the envelope is closed by closure member 20. A chamber or airspace 21 is provided between closure member 20 and partition 16, and a spring 22 provides contact between contact member 17 in partition 16′ and the contact member 23 extending through closure member 20.

Figure 2A:
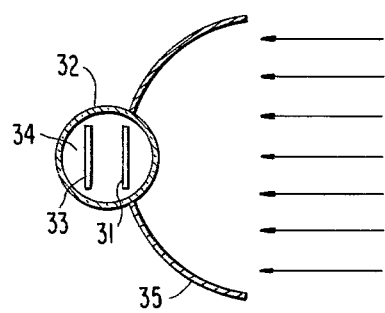
FIG. 2a is a cross-sectional end view of a schematic representation of one embodiment of a photoelectrochemical battery provided with reflector means.

FIG. 2a illustrates a battery with an envelope of circular cross-section housing a photoelectrode 31 and counterelectrode 33, in envelope 32 containing electrolyte 34. A reflector 35 is attached so as to concentrate the solar radiation onto the photoelectrode 31.

Figure 2B:
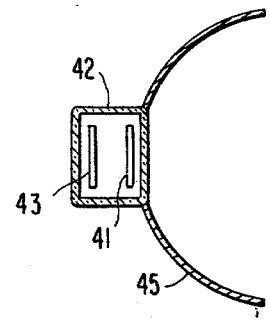
FIG. 2b is a cross-sectional end view of a schematic representation of a second embodiment of a photoelectrochemical battery provided with reflector means.

FIG. 2b illustrates a similar arrangement, comprising a photoelectrode 41 and a counterelectrode 43, in housing 42 which is an envelope having a rectangular cross-section. A reflector 45 is attached to the housing so as to concentrate solar radiation onto the photoelectrode 41.

In both FIGS. 2a and 2b the reflector is preferably parabolic with the photoelectrode positioned at the focus of the paraboloid.

The following examples illustrate some non-limiting experimental batteries falling within the scope of the present invention.

EXAMPLE 1

A 1 cm long 2 mm diameter titanium bar is spot-welded to a titanium foil electrode having a 0.67 mm thickness and a 1 cm$^2$ polycrystalline CdSe surface. The bar is inserted in the central hole of a 15.5 mm diameter rubber piston of a disposable 5 ml plastic syringe. At the other side of the piston a 1 cm$^2$ cobalt sulfide covered stainless steel 0.3 mm thick counterelectrode is attached by spotwelding on the titanium bar. The welding is done in such a way that the two electrodes are parallel with the connecting bar, whose thickness separates between them. This structure constitutes the module.

An 18 cm long glass tube of 15 mm internal diameter is stoppered with a rubber stopper through which a titanium bar is inserted, holding a photoelectrode. 2 ml of alkaline polysulfide solution is introduced while holding the tube vertically and the first module is slid therein. While the module is pushed downwardly, a hollow needle is inserted between the glasswall and the piston in order to let trapped air escape. When the module is in place the needle is removed. Again 2 ml of alkaline polysulfide solution is introduced and the second module is slid in the same fashion. After eight modules are introduced in this way, the tube is closed with a rubber stopper having a piece of titanium extending therethrough. A counterelectrode and piston are secured to the inner side of the titanium piece by way of a small steel spring.

This tube, when exposed to sunlight of 100 mW/cm$^2$ (AM1), gives an open circuit voltage of 5.5 volts and a closed circuit current of 9 mA. Maximum power is 20 mW (3.6 V and 5.5 mA).

EXAMPLE 2

A 10 cm long glass tube of 15 mm internal diameter is filled in a way identical to that described in Example 1. However, in this case the partitions are hollow rubber pistons, which make them compressible. Therefore, no steel spring is necessary and the expansion of the liquid on exposure to sunlight is compensated for by the compression of the pistons. Prolonged exposure to the sun does not cause any leakage problems.

EXAMPLE 3

A 12 cm long glass tube of 15 mm internal diameter is filled in a way identical to that described in Example 1. The pistons in this case are 3 mm thick round polyvinylchloride discs. A small groove is provided around the periphery of the disc on which an O-ring is accommodated. Because these partitions are not compressible, a small spring is necessary, as in Example 1, but because they are appreciably thinner than the partitions used in Example 1, the overall length of the cell is shorter.

Photochemical performance of the cells in Examples 2 and 3 are substantially identical to that of the one in Example 1. No leakage of electrolyte occurs between the compartments, so that the total voltage of the cell is equal to the sum of the individual voltages of the electrodes used.

EXAMPLE 4

A 12 cm long glass envelope of rectangular cross-section of 1.5×1.0 cm is filled as described in Example 3. The partitions in this case are rectangular polyvinylchloride discs of 3 mm thickness, provided with a sealing material in order to fit and slide within the envelope. Under AM1 irradiation, the resulting cell yields an open circuit voltage of 5.9 V and a short circuit current of 7.7 mA. Maximum power is 18 mW. No leakage problems occur.

EXAMPLE 5

A glass tube of 12 cm length and 15 mm cross-section is filled as described in Example 3. The partitions are made out of titanium metal in this case. At its edge a groove also made out of titanium holds the O-ring. The photoelectrode is attached by spotwelding to this disc and the remaining Ti surface is well coated with tar. At the other side the titanium is coated with Co-sulfide, which is a catalytic material for the counterelectrode, thereby obviating the necessity for a separate counterelectrode. In spite of the different geometrical arrangement, the performance of this cell is substantially identical to that of Example 4.

EXAMPLE 6

A cell is constructed as in Example 1. The photoelectrodes in this embodiment are 4 mm$^2$ GaAs monocrystals embedded in epoxy resin and the counterelectrodes are made of carbon. The electrolyte is a solution of 0.8 M Se, 0.1 M Se$^{--}$ and 1 M KOH. In AM1 solar radiation, this cell gives an open circuit voltage of 6 volts and a short circuit current of 0.72 mA, which corresponds to 18 mA/cm$^2$.

EXAMPLE 7

Cells are constructed as shown in FIG. 2 having a circular cross-section as described in Example 1 and a rectangular cross-section as described in Example 4. These cells are provided with reflectors made of commercially available mirror finished aluminum sheet metal having dimensions of 20×12 cm$^2$ and curved to form a bow of 5 cm depth. With this simple array most current output is almost tripled to 19 mA under maximum power conditions. Also, under these conditions, substantially no leakage problems occur.

What is claimed is:

1. A battery comprising a plurality of photoelectrochemical cell arranged in series in an envelope adapted to permit solar energy to pass therethrough, each of said cells comprising a photoelectrode, a counterelectrode, and an electrolyte, the photoelectrode and counterelectrode of each cell being attached to and forming electrical contact with conductive means; said battery further comprising at least one separation means for separating each of said cells from one another so as to form a liquid-tight fit within said envelope whereby each of said cells is liquid tight.

2. A battery as defined by claim 1 wherein said separation means is a partition adapted to slide within said envelope.

3. A battery as defined by claim 2 wherein said counterelectrode is constituted by said partition.

4. A battery comprising a plurality of electrochemical cells arranged in series in an envelope, each of said cells comprising an electrode, a counterelectrode, and an electrolyte, the electrode and counterelectrodes of each cell being attached to and forming electrical contact with conductive means; said battery further comprising at least one separation means for separating each of said cells from one another, said separation means being a partition adapted to slide within said envelope.

5. A battery as defined by claim 4 wherein said electrochemical cells are photoelectrochemical cells, said envelope is adapted to permit light to pass therethrough, and said electrodes are photoelectrodes.

6. A battery as defined by claim 5 wherein a curved portion of said envelope is adapted to concentrate solar energy onto said photoelectrodes.

7. A battery as defined by claim 6 wherein said reflector means are arranged outside of said envelope.

8. A battery as defined by claim 7 wherein said reflector means comprises a pair of curved reflectors attached to the envelope so as to concentrate solar energy onto said photoelectrodes.

9. A battery as defined by claim 5 further comprising reflector means for concentrating solar energy onto said photoelectrodes.

10. A battery as defined by claim 4 wherein each of said conductive means extends through one of said at least one separation means.

11. A battery as defined by claim 10 wherein one of said electrodes is connected to one of said conductive means on one side of said separation means and one of said counterelectrodes is connected to said conductive means on the other side of said separation means.

12. A battery as defined by claim 4 wherein said separation means is made of metal, and wherein said separation means is electrically insulated on a first side thereof facing one of said cells and wherein said separation means forms the counterelectrode for the cell on the other side of said separation means.

13. A battery as defined by claim 4 wherein said separation means is a partition made of plastic or rubber.

14. A battery as defined by claim 4 wherein said separation means are partitions made of an inert material, and wherein each of said partitions comprises a groove in its peripheral rim and an inert resilient material adapted to provide a sliding but leakproof fit with said envelope.

15. A battery as defined by claim 4 further comprising one end separator firmly attached to said envelope.

16. A battery as defined by claim 4 further comprising a chamber at one end of said envelope, said chamber being adapted to allow for changes in the volume of the cells of said battery.

17. A battery as defined by claim 16 wherein said chamber comprises conductive means for electrically conducting current generated within said cell to the outside thereof.

18. A battery as defined by claim 17 wherein said conductive means within said chamber is a metal spring adapted to permit movement of the walls of said chamber.

19. A battery as defined by claim 4 wherein said envelope has a cross-section which is: oval, cylindrical, rectangular, polygonal or a combination thereof.

20. A battery comprising a plurality of photoelectrochemical cells arranged in series in an envelope, said envelope being adapted to permit solar radiation to pass therethrough, each of said cells comprising a photoelectrode, a counterelectrode, and an electrolyte, the photoelectrode and counterelectrode of each cell being attached to and forming electrical contact with conductive means; said battery further comprising at least one separation means for separating each of said cells from one another, said separation means comprising means for compensating for volumetric changes within each of said cells.

21. A battery comprising a plurality of electrochemical cells arranged in an envelope, each of said cells comprising an electrode, a counterelectrode, and an electrolyte, the electrode and counterelectrode of each cell being attached to and forming electrical contact with conductive means; said battery further comprising at least one separation means for separating each of said cells from one another, said separation means being a partition adapted to slide within said envelope.

* * * * *